US012607250B2

(12) United States Patent
Cohen

(10) Patent No.: US 12,607,250 B2
(45) Date of Patent: Apr. 21, 2026

(54) SYSTEM AND METHOD FOR LEVERAGING FORCE

(71) Applicant: Menashe Cohen, Bnei Barak (IL)

(72) Inventor: Menashe Cohen, Bnei Barak (IL)

(*) Notice: Subject to any disclaimer, the term of this patent is extended or adjusted under 35 U.S.C. 154(b) by 0 days.

(21) Appl. No.: 18/763,326

(22) Filed: Jul. 3, 2024

(65) Prior Publication Data

US 2025/0035194 A1     Jan. 30, 2025

(30) Foreign Application Priority Data

Jul. 4, 2023     (IL) .......................................... 304259

(51) Int. Cl.
| *F16H 13/02* | (2006.01) |
| *F03G 7/10* | (2006.01) |
| *F16H 21/12* | (2006.01) |

(52) U.S. Cl.
CPC .............. F16H 13/02 (2013.01); *F03G 7/119* (2021.08); *F16H 21/12* (2013.01)

(58) Field of Classification Search
CPC . F16H 13/02; F16H 1/28; F16H 21/12; F03G 7/119
See application file for complete search history.

(56) References Cited

U.S. PATENT DOCUMENTS

| 4,321,842 A | * | 3/1982 | Stromotich | ............... F16H 9/26 |
| | | | | 475/182 |
| 5,060,603 A | | 10/1991 | Williams | |

| 5,935,038 A | * | 8/1999 | Woytaszek | ................ F16H 1/46 |
| | | | | 475/338 |
| 5,976,047 A | * | 11/1999 | Woytaszek | ............. H02K 7/116 |
| | | | | 475/5 |
| 9,328,627 B2 | | 5/2016 | Hennig | |
| 2005/0221945 A1 | | 10/2005 | Plath | |

(Continued)

FOREIGN PATENT DOCUMENTS

| CN | 110566643 A | 12/2019 |
| DE | 102020004112 A1 | 1/2022 |

(Continued)

OTHER PUBLICATIONS

"Steam Locomotive", Wikipedia. Available online: [https://en.wikipedia.org/wiki/Steam_locomotive], 34pp.

(Continued)

*Primary Examiner* — William C Joyce
(74) *Attorney, Agent, or Firm* — The Roy Gross Law Firm, LLC; Roy D. Gross

(57)     ABSTRACT

A system (100) for leveraging force comprises a main crosspiece (2) having at least one first end (2a) and an opposite at least one second end (2b) end. The main crosspiece (2) is interconnected by means of an axle (5) with a static wheel (1) at a location (2c), in between the first end (2a) and second end (2b) of the main crosspiece (2), the static wheel (1) is characterized by a first diameter (D). The second end (2b) of the crosspiece (2) is configured to provide an output force $F_{out}$ at second end (2b) correlated to $(L/l)F_{in}$, where $F_{in}$ is an input force applied to the driving wheel (4), L is a distance between second end (2b) and the main axle (5) and L is a distance between the first end (2a) and the main axle (5).

6 Claims, 3 Drawing Sheets

(56)　　　　　　　References Cited

U.S. PATENT DOCUMENTS

2006/0052214 A1 *　3/2006　Ito ........................ A61B 1/0669
　　　　　　　　　　　　　　　　　　　　475/330
2014/0123787 A1　　5/2014　Zhu et al.

FOREIGN PATENT DOCUMENTS

| GB | 1461547 A | 1/1977 |
|----|-----------|--------|
| IL | 304259 A  | 1/2024 |
| SE | 302890 B  | 8/1968 |

OTHER PUBLICATIONS

Israel Patent Office, Search Report—ILPO for Israeli Patent Application No. 304259, dated Oct. 9, 2023, 2pp.
Australian Government, IP Australia, Examination report No. 1 for Standard Patent Application for Australian Patent Application No. 2024204628, dated Sep. 16, 2024, 6pp.

* cited by examiner

SYSTEM AND METHOD FOR LEVERAGING FORCE

CROSS REFERENCE TO RELATED APPLICATIONS

This application claims the benefit of priority of Israeli Patent Application No. 304259, filed on Jul. 4, 2023, the contents of which are all incorporated herein by reference in their entirety.

FIELD OF THE INVENTION

The present invention pertains to system, modules and method for leveraging force.

BACKGROUND OF THE INVENTION

Known in the art are internal combustion engines and the manner of translating reciprocal motion into rotary motion with improved efficiency; and an improved cam-type crank-disc that more closely matches the source work potential of a reciprocating piston to the receiving work ability of the engine output shaft, see U.S. Pat. No. 5,060,603. Likewise, bearing devices, for example in a turbomachine, are a part of the public domain, see U.S. Pat. No. 9,328,627. A system for leveraging force is still a long-felt need.

SUMMARY OF THE INVENTION

It is hence the object of the discloses a system for leveraging force comprising at least one elongated cross-piece (main crosspiece 2) having at least one first end 2a and an opposite at least one second end 2b end, the main crosspiece 2 is interconnected by means of an axle 5 with a static wheel (1) at a location 2c, in between the 2a and 2b, the static wheel 1 is characterized by a first diameter (D). A driving wheel 3, characterized by a second diameter (d), is interconnected, by means of hinge 6 with the main crosspiece 2 at the at least one second end 2b; the first diameter (D) is configurable to be smaller, equal to or greater than the second diameter (d). Optionally, the driving wheel 3 is provided in connection with a driven wheel 4 and/or vis versa the driving wheel 4 is provided in connection with a driven wheel 4; still optionally, the small driving wheel 4 is in communication with the small driven wheel 3 by means of connector 8, the connector 8 linking small driven wheel axle 6 and small driving wheel axle 7. A surface of small driving wheel 4 is in non-slipping communication with a surface 1b of the static wheel 1. A first end 2a of the crosspiece 2 is in communication with the small driven wheel 3 by a small driven wheel axle. The second end 2b of the crosspiece 2 is configured to provide an output force $F_{out}$ at second end 2b correlated to $(L/l)F_{in}$, where $F_{in}$ is an input force applied to the driving wheel 4, L is a distance between second end 2b and the main axle 5 and l is a distance between the first end 2a and the main axle 5.

Another object of the invention is to disclose a system as defined in any if the above, wherein the L/l ratio, which determined the degree of leveraging of $F_{in}$ to $F_{out}$, is not affecting and not affected by the constant path, namely the circumference of the static wheel 1, in which the driving wheel passes at a given time.

Another object of the invention is to disclose a system as defined in any if the above, wherein the system is implemented or otherwise used or connected with mechanisms with moving element and energy production.

Another object of the invention is to disclose a system as defined in any if the above, wherein the system is implemented or otherwise used or connected with at least one member of a group consisted of land vehicles, sea or undersea vessels, airplanes and the like, motors, engines, including main engines and support engines, hybrid electrical systems, pumps, and powerplants.

The term energy production refers generally to the production of electrical energy and/or the production of hydrogen gas.

As used herein, the term vehicle is not limited to just an automobile, truck, van or sport utility vehicle, but includes any self-propelled or towed conveyance suitable for transporting a burden, or any stationary or non-road engine equipment.

In an embodiment, the term "engine" as used herein refers to any means suitable for replacing or supporting internal combustion engine, such as diesel engine, spark-ignition engine fueled by gasoline or any other suitable combustive fluid.

Another object of the invention is to disclose a method of leveraging force comprising steps of providing at least one elongated crosspiece (main crosspiece 2) having at least one first end 2a and an opposite at least one second end 2b end; interconnecting the main crosspiece 2 by means of an axle 5 with a static wheel (1) at a location 2c, in between the 2a and 2b, the static wheel 1 is characterized by a first diameter (D); interconnecting a driving wheel 3, characterized by a second diameter (d), by means of hinge 6 with the main crosspiece 2 at the at least one second end 2b; configuring the first diameter (D) to be smaller, equal to or greater than the second diameter (d); optionally, proving the driving wheel 3 in connection with a driven wheel 4 and/or vis versa proving the driving wheel 4 in connection with a driven wheel 3; still optionally, communicating the small driving wheel 4 with the small driven wheel 3 by means of connector 8, the connector 8 linking small driven wheel axle 6 and small driving wheel axle 7; communicating in a non-slipping manner a surface of small driving wheel 4 with a surface 1b of the static wheel 1; communicating the first end 2a of the crosspiece 2 with the small driven wheel 3 by a small driven wheel axle; the second end 2b of the crosspiece 2 is configured to provide an output force $F_{out}$ at second end 2b correlated to $(L/l)F_{in}$, where $F_{in}$ is an input force applied to the driving wheel 3 or 4, L is a distance between second end 2b and the main axle 5 and l is a distance between the first end 2a and the main axle 5.

Another object of the invention is to disclose a method as defined in any of the above, wherein force leveraging is defined as a function of Eq. 1, namely $$F_{out} = \frac{L+l}{R} F_{in}.$$

Another object of the invention is to disclose a method as defined in any of the above, wherein the L/l ratio, which determined the degree of leveraging of $F_{in}$ to $F_{out}$, is not affecting and not affected by the constant path, namely the circumference of the static wheel 1, in which the driving wheel passes at a given time.

Another object of the invention is to disclose a method as defined in any of the above, wherein the method is implemented or otherwise used or connected with mechanisms with moving element and energy production.

Another object of the invention is to disclose a method as defined in any of the above, wherein the method is implemented or otherwise used or connected with at least one member of a group consisted of land vehicles, sea or undersea vessels, airplanes and the like, motors, engines, including main engines and support engines, hybrid electrical systems, pumps, and powerplants.

Another object of the invention is to disclose methods and systems for leveraging force comprising a crosspiece e.g., as shown in the figures, configured to provide an output force $F_{out}$ at second end $2b$ correlated to $(L/l)F_{in}$, where $F_{in}$ is an input force applied to the driving wheel, L is a distance between second end $2b$ and the main axle and l is a distance between said first end $2a$ and said main axle.

BRIEF DESCRIPTION OF THE FIGURES

Reference will now be made to the accompanying drawings, which are not necessarily drawn to scale.

FIG. $1a,b$ and FIG. $2a,b$ depicts two different systems and methods for leveraging force according to an embodiment of the invention.

DETAILED DESCRIPTION OF THE PREFERRED EMBODIMENTS

Figure 1:
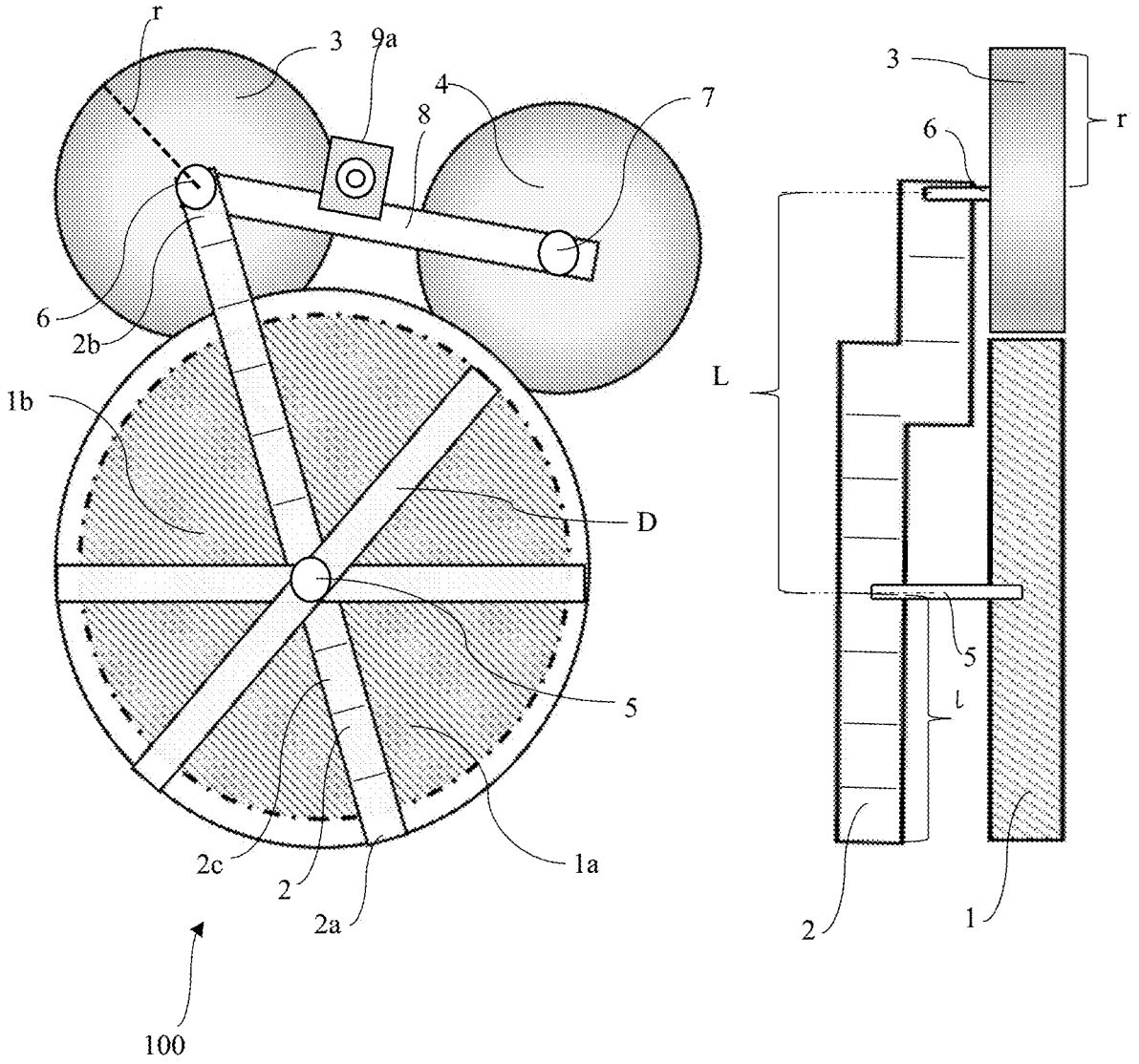
Figure 2:
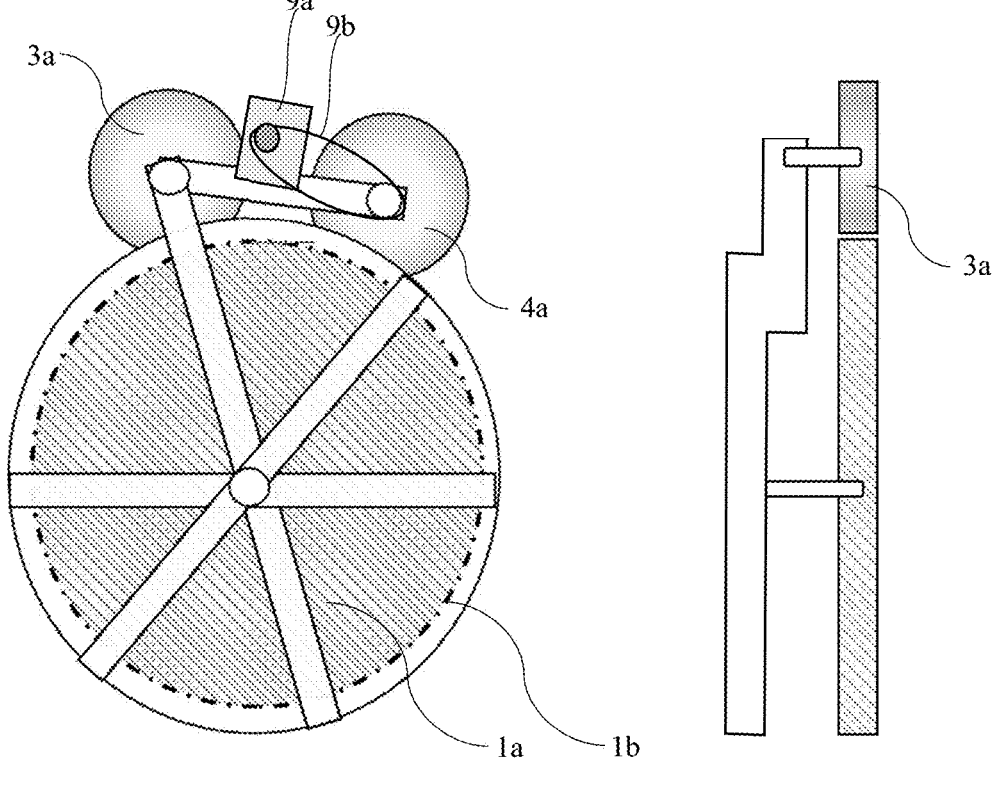

Reference is now made to any of FIGS. $1a,b$ and $2a,b$, each of which discloses a schematic and in an out-of-scale manner side and front views (respectively) of two different systems for leveraging force according to an embodiment of the invention. The systems are to be used in e.g., all mechanisms with moving element and energy production. It comprises at least one elongated crosspiece; e.g., a bar-like member provided useful as at least one first main crosspiece (2). The crosspiece is having at least one first end $(2a)$ and an opposite at least one second end $(2b)$ end. The main crosspiece (2) is interconnected by means of an axle (5) with a static wheel (1) at a location $(2c)$, in between the first end $(2a)$ and second end $(2b)$ of the main crosspiece (2). The static wheel (1) is characterized by a first diameter (D). A driving wheel (3), characterized by a second diameter (d), is interconnected, by means of hinge (6) with the main crosspiece (2) at the at least one second end $(2b)$. The first diameter (D) is configurable to be smaller, equal to or greater than the second diameter (d).

Optionally, and according to an embodiment of the invention, driving wheel (3) is provided in connection with a driven wheel (3) or 4. Optionally, and according to yet another embodiment of the invention, driving wheel (3) or (4) is provided in connection with a driven wheel (3) or (4). Optionally, and according to yet another embodiment of the invention, the driving wheel (3) or (4) is in communication with a driven wheel (3) or (4) by means of connector (8). The connector (8) is linking the driven wheel axle (6) and the driving wheel axle (7).

Optionally, and according to yet another embodiment of the invention, a motor ($9a$). optionally via a gear ($9b$), is actuating one or more driving wheels.

The surface of driving wheel (3) or (4) is in non-slipping communication with a surface ($1b$) of the static wheel (1). The first end $(2a)$ of the crosspiece (2) is in communication with the driven wheel (3) or (4) by a driven wheel axle.

It is acknowledged in a non-limiting manner that the novelty and the invention step here is that the second end $(2b)$ of the crosspiece (2) is configured to provide an output force $F_{out}$ at second end $(2b)$ correlated to $(L/l)$ $F_{in}$, where $F_{in}$ is an input force applied to the driving wheel (4), L is a distance between second end $(2b)$ and the main axle (5) and L is a distance between the first end $(2a)$ and the main axle (5).

Reference is still made to FIGS. $1a,b$ and $2a,b$ each of which enables a method of leveraging force. The method comprising steps of providing at least one elongated crosspiece (main crosspiece (2) having at least one first end $(2a)$ and an opposite at least one second end $(2b)$ end; and interconnecting the main crosspiece (2) by means of an axle (5) with a static wheel (1) at a location $(2c)$, in between the first end $(2a)$ and second end $(2b)$, the static wheel (1) is characterized by a first diameter (D). The method further comprising steps of interconnecting a driving wheel (3), characterized by a second diameter (d), by means of hinge (6) with the main crosspiece (2) at the at least one second end $(2b)$; and configuring the first diameter (D) to be smaller, equal to or greater than the second diameter (d). The method further comprising steps of communicating in a non-slipping manner a surface of small driving wheel (4) with a surface $(1b)$ of the static wheel (1); and communicating the first end $(2a)$ of the crosspiece (2) with the small driven wheel (3) by a small driven wheel axle.

It is acknowledged in a non-limiting manner that the novelty and the invention step here is that the second end $(2b)$ of the crosspiece (2) is configured to provide an output force $F_{out}$ at second end $2b$ correlated to $(L/l)$ $F_{in}$, where $F_{in}$ is an input force applied to the driving wheel (4), Lis a distance between second end $(2b)$ and the main axle (5) and L is a distance between the first end $(2a)$ and the main axle (5).

It is noted that driving and driven wheels (3 and 4, FIG. $1a,b$) are two times bigger than driving and driven wheels ($3a$ and $4b$, FIG. $2a,b$) so that $F_{in}/F_{out}$ varies.

Optionally, the method comprising a step of proving the driving wheel (3) in connection with a driven wheel (4) and/or vis versa proving the driving wheel (4) in connection with a driven wheel (3); still optionally, the method comprising step of communicating the small driving wheel (4) with the small driven wheel (3) by means of connector (8), the connector (8) linking small driven wheel axle (6) and small driving wheel axle (7). Optionally, and according to yet another embodiment of the invention, the method comprising a step of providing then using a motor ($9a$). optionally via a gear ($9b$), for actuating one or more driving wheels.

It is acknowledged that the changeable L/l ratio, which determined the degree of leveraging of $F_{in}$ to $F_{out}$, is not affecting and not affected by the constant path (the circumference of the static wheel 1) in which the driving wheel passes at a given time.

The term "wheel" refers in a non-limiting manner to all type of one or more, and array of wheels and the like, with or without gear and power transitions thereof, including Cogwheel and mechanisms designed to transmit torque to another wheel, gear or toothed component. Such a transition is selected e.g., from mechanical, modules powered by compressed air or compressed inert gases, or fluids, such as oil or water.

Figure 3:
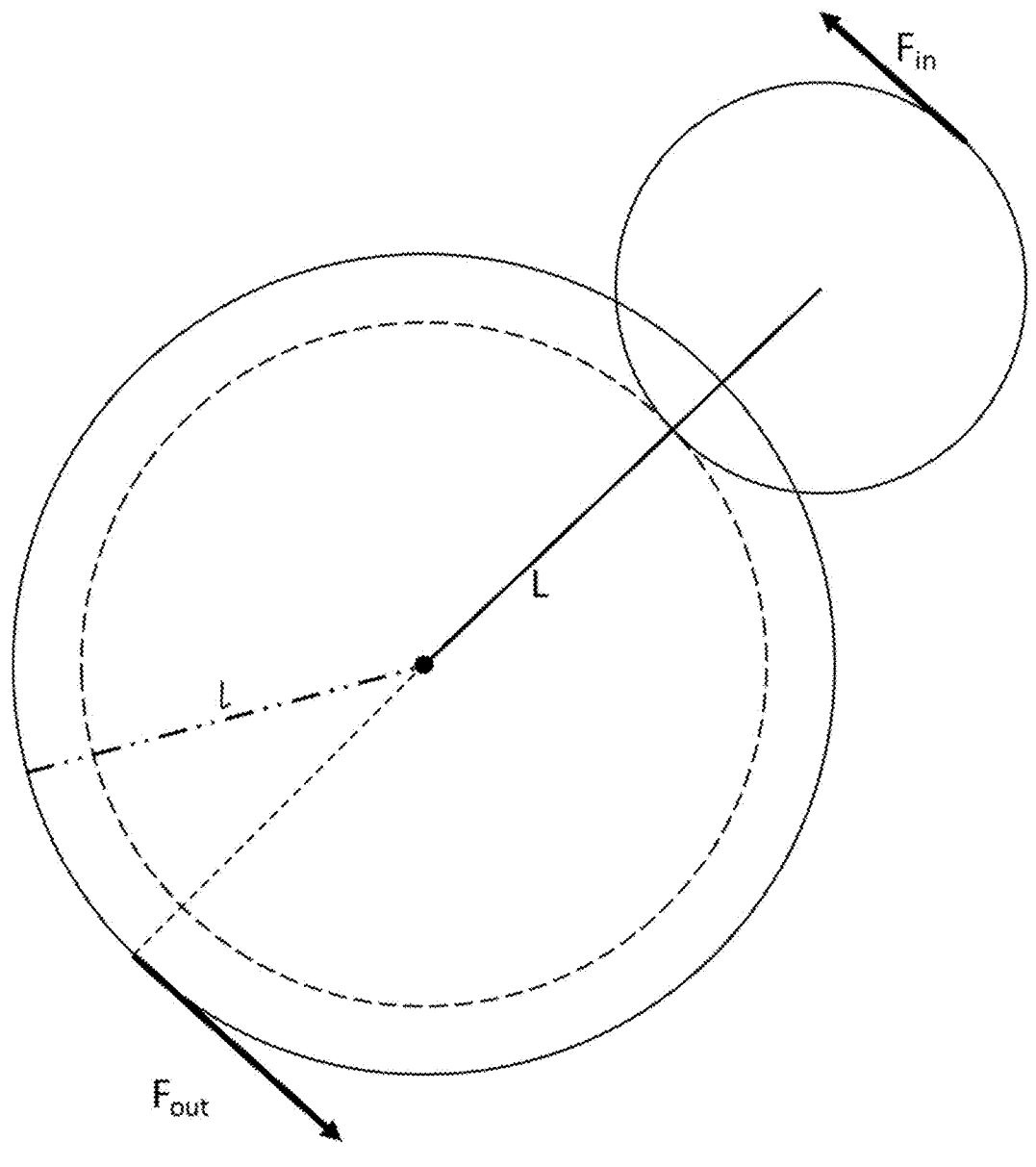
FIG. 3 illustrates the effectivity of force leveraging of the systems and methods according to an embodiment of the invention.

Reference is now made to FIG. 3, schematically illustrating a system for leveraging force according to an embodiment of the invention, wherein the force leverage is defined in Eq. 1 below:

The leveraged output force $F_{out} = \dfrac{L}{l} F_{in}$     Eq. 1

Table 1 depicts a few examples where an input force ($F_{in}$) is 1 N. Assuming no energy lost due to e.g., friction and heating, the output force $F_{out}$ is in correlation (function) with $F_{in}$ as defined in Eq. 1.

TABLE 1

Leveraging $F_{in}$ to elevated (or reduced) $F_{out}$ in system 100 and methods as defined in any of the above.

| input force (N) | long radius (L, m) | short radius (l, m) | Radius of driving wheel (r, m) | ratio long radius to short radius (L/l) | output force (N) | Ratio output to input power |
|---|---|---|---|---|---|---|
| 1 | 7 | 5 | 1 | 1.4 | 1.4 | 7 |
| 1 | 10 | 5 | 1 | 2 | 2 | 10 |
| 1 | 100 | 5 | 1 | 20 | 20 | 100 |
| 1 | 5 | 5 | 1 | 1 | 1 | 5 |
| 1 | 5 | 20 | 1 | 0.25 | 0.25 | 5 |

The system and method of the present invention as shown in the table above grantee efficient means for leveraging force with reduced impact on the environmental carbon print.

The invention discloses methods, systems and muddles thereof for leveraging force. The system comprises, inter alia, a crosspiece e.g., as shown in the figures, configured to provide an output force $F_{out}$ at effector end (see e.g., crosspiece 2b) correlated to $(L/l)F_{in}$, where $F_{in}$ is an input force applied to the driving wheel, L is a distance between second end 2b and the main axle and l is a distance between said first end 2a and said main axle.

Reference is now made to FIG. 1a. Output power $P_{out}$= $(L/r)P_{in}$, where $P_{in}$ is input power. Hence, when the long radius L is 10 m and the radius of the driving wheel is 1 m, the ratio of output power to input power is 10:1.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the invention has been described in terms of various specific embodiments, those skilled in the art will recognize that the invention can be practiced with modification within the spirit and scope of the claims.

The invention claimed is:

1. A system (100) for leveraging force comprising a main crosspiece (2) having at least one first end (2a) and an opposite at least one second end (2b), said main crosspiece (2) is interconnected by means of an axle (5) with a static wheel (1) at a location (2c), in between said first end (2a) and second end (2b) of said main crosspiece (2), said static wheel (1) has a center and is characterized by a first diameter (D);

a driven wheel (3), characterized by a second diameter (d), is interconnected, by means of a hinge (6) with said main crosspiece (2) at said at least one second end (2b);

said first diameter (D) is configurable to be smaller, equal to, or greater than said second diameter (d);

a surface of the driven wheel (3), and a driving wheel (4), is in non-slipping communication with a surface (1b) of said static wheel (1);

said second end (2b) of said crosspiece (2) is configured to provide an output force $F_{out}$ at second end (2b) correlated to (L/l) $F_{in}$, where $F_{in}$ is an input force applied to said driving wheel (4), L is a distance between second end (2b) and said axle (5) and 1 is a distance between said first end (2a) and said axle (5), wherein output force $F_{out}$ is not coaxial with the center of the static wheel (1), and wherein the correlation between $F_{in}$ and $F_{out}$ accounts for the structural dimensions of the driving wheel (4).

2. The system of claim 1, wherein said L/l ratio, which determines the degree of leveraging of $F_{in}$ to $F_{out}$, is not affected by and does not affect a circumference of the static wheel (1) at which the driving wheel (4) passes at a given time.

3. The system of claim 1, wherein said driving wheel (4) is in communication with said driven wheel (3) by means of a connector (8), said connector (8) linking the driven wheel hinge (6) and a driving wheel axle (7); said first end (2a) of said crosspiece (2) is in communication with said driven wheel (4) said driven wheel hinge (6).

4. A method of leveraging force comprising steps of a. providing a main crosspiece (2) having at least one first end (2a) and an opposite at least one second end (2b), b. interconnecting said main crosspiece (2) by means of an axle (5) with a static wheel (1) at a location (2c), in between said first end (2a) and said second end (2b), said static wheel (1) has a center and is characterized by a first diameter (D);

c. interconnecting a driven wheel (3), characterized by a second diameter (d), by means of a hinge (6) with said main crosspiece (2) at said at least one second end (2b);

d. configuring said first diameter (D) to be smaller, equal to or greater than said second diameter (d);

e. communicating in a non-slipping manner a surface of a driving wheel (4) with a surface (1b) of said static wheel (1);

said second end (2b) of said crosspiece 2 is configured to provide an output force $F_{out}$ at second end (2b) correlated to (L/l) $F_{in}$, where $F_{in}$ is an input force applied to said driving wheel (4), L is a distance between second end (2b) and said axle (5) and 1 is a distance between said first end (2a) and said axle (5), wherein output force $F_{out}$ is not coaxial with the center of the static wheel (1), and wherein the correlation between $F_{in}$ and $F_{out}$ accounts for the structural dimensions of the driving wheel (4).

5. The method of claim 4, wherein force leveraging is defined as a function $F_{out}$ (L/l)$F_{in}$+R, where R is a variable accounting for the structural dimensions of the driving wheel (4).

6. The method of claim 4, wherein said L/l ratio, which determines the degree of leveraging of $F_{in}$ to $F_{out}$, is not affected by and does not affect a circumference of the static wheel (1) at which the driving wheel (4) passes at a given time.

* * * * *